(12) United States Patent
Huang

(10) Patent No.: US 10,427,529 B2
(45) Date of Patent: Oct. 1, 2019

(54) ELECTRIC VEHICLE AND METHOD OF DRIVING AND CHARGING THE SAME

(71) Applicant: Zhongshan Broad-Ocean Motor Co., Ltd., Zhongshan (CN)

(72) Inventor: Fengtai Huang, Zhongshan (CN)

(73) Assignee: ZHONGSHAN BORAD-OCEAN MOTOR CO., LTD., Zhongshan (CN)

(*) Notice: Subject to any disclaimer, the term of this patent is extended or adjusted under 35 U.S.C. 154(b) by 682 days.

(21) Appl. No.: 15/011,422

(22) Filed: Jan. 29, 2016

(65) Prior Publication Data

US 2016/0144729 A1 May 26, 2016

Related U.S. Application Data

(63) Continuation-in-part of application No. PCT/CN2014/082999, filed on Jul. 25, 2014.

(51) Int. Cl.
*B60L 53/14* (2019.01)
*H02J 7/02* (2016.01)
*B60L 11/18* (2006.01)
*B60L 50/51* (2019.01)
*B60L 53/24* (2019.01)

(52) U.S. Cl.
CPC ........... *B60L 11/1803* (2013.01); *B60L 50/51* (2019.02); *B60L 53/14* (2019.02); *B60L 53/24* (2019.02); *H02J 7/02* (2013.01); *Y02T 10/7005* (2013.01); *Y02T 10/7072* (2013.01); *Y02T 10/7258* (2013.01); *Y02T 90/127* (2013.01); *Y02T 90/14* (2013.01)

(58) Field of Classification Search
CPC .............. B60L 11/1803; B60L 11/1861; B60L 11/1811; B60L 15/20; H02J 7/02; Y02T 10/7258
See application file for complete search history.

(56) References Cited

U.S. PATENT DOCUMENTS

| 9,327,605 | B2* | 5/2016 | Januschevski | H02J 7/022 |
| 9,973,110 | B2* | 5/2018 | Sadki | H02P 29/032 |
| 2009/0121659 | A1* | 5/2009 | Oyobe | B60L 53/20 318/12 |

(Continued)

FOREIGN PATENT DOCUMENTS

| CN | 202142879 U | 2/2012 |
| CN | 102386666 A | 3/2012 |

(Continued)

*Primary Examiner* — Jared Fureman
*Assistant Examiner* — Emmanuel Dominique
(74) *Attorney, Agent, or Firm* — Matthias Scholl P.C.; Matthia Scholl

(57) ABSTRACT

A method of charging an electric vehicle. The electric vehicle includes a battery, an inverter, and a motor including at least three-phase coil windings. When the electric vehicle is in a driven state, a direct current output from the battery is converted into a three-phase alternating current by a forward operation control of the inverter. The three-phase alternating current is output to the motor and drives the motor to operate. When the electric vehicle is in a charging state, an external three-phase alternating current is input into the inverter via three charging inductors and converted into the direct current by a reverse operation control of the inverter to charge the battery.

16 Claims, 8 Drawing Sheets

(56) References Cited

U.S. PATENT DOCUMENTS

| | | | |
|---|---|---|---|
| 2009/0146612 A1* | 6/2009 | Oyobe | B60L 53/24 |
| | | | 320/138 |
| 2011/0187185 A1* | 8/2011 | Dupuy | B60L 15/007 |
| | | | 307/10.1 |
| 2013/0265011 A1* | 10/2013 | Nilsson | B60L 11/1814 |
| | | | 320/137 |
| 2013/0271077 A1 | 10/2013 | Kim et al. | |
| 2014/0292243 A1* | 10/2014 | Bouchez | H02M 7/003 |
| | | | 318/400.29 |

FOREIGN PATENT DOCUMENTS

| | | |
|---|---|---|
| CN | 102651631 A | 8/2012 |
| CN | 104092273 A | 10/2014 |

\* cited by examiner

ELECTRIC VEHICLE AND METHOD OF DRIVING AND CHARGING THE SAME

CROSS-REFERENCE TO RELATED APPLICATIONS

This application is a continuation-in-part of International Patent Application No. PCT/CN2014/082999 with an international filing date of Jul. 25, 2014, designating the United States, now pending. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND OF THE INVENTION

Field of the Invention

The invention relates to an electric vehicle and a method of driving and charging the same.

Description of the Related Art

Typically, as shown in FIG. 1, an electric vehicle is charged using an independent charger, which is able to convert the three-phase alternating current into the high voltage direct current. Optionally, as shown in FIG. 2, some components of the inverter of an electric vehicle constitute a rectifier, and then together with an additional inductor and a single-phase alternating current power supply, to charge the electric vehicle. However, the two charging modes involve complicate structures, high costs, and the charging efficiency is low.

SUMMARY OF THE INVENTION

In view of the above-described problems, it is one objective of the invention to provide an electric vehicle and a method of driving and charging the same. The battery is charged through the reverse operation of the inverter of the motor driving system. Specifically, the inverter functions as a charging device in the charging state. Thus, the electric vehicle of the invention feature simple and compact structure, convenient control, low production cost, and high charging efficiency.

To achieve the above objective, in accordance with one embodiment of the invention, there is provided a method of charging an electric vehicle, the electric vehicle comprising a battery, an inverter, and a motor comprising at least three-phase coil windings. When the electric vehicle is in a driven state, a direct current output from the battery is converted into a three-phase alternating current by a forward operation control of the inverter, and the three-phase alternating current is output to the motor and drives the motor to operate. When the electric vehicle is in a charging state, an external three-phase alternating current is input into the inverter via three charging inductors and converted into the direct current by a reverse operation control of the inverter to charge the battery.

In a class of this embodiment, the three charging inductors are formed by the three-phase coil windings of the motor, and the coil windings of the motor are utilized as the charging inductors.

In a class of this embodiment, the forward operation control of the inverter comprises detecting phase currents of the coil windings of the motor and rotor positions, and controlling the current of the motor to drive the rotor of the motor to rotate. The reverse operation control of the inverter comprises detecting the phase currents of the coil windings of the motor and a terminal voltage of the external three-phase alternating current, and converting the three-phase alternating current into the direct current to charge the battery.

In a class of this embodiment, a phase number of the coil winding of the motor is 3N, and N represents an integer.

In a class of this embodiment, a number of the inverters is N, and each inverter is correspondingly connected to three coil windings of the motor.

In accordance with one embodiment of the invention, there is provided an electric vehicle using the above method. The electric vehicle comprises: the battery, the inverter, and the motor. The motor comprising a stator assembly and a rotor assembly. The stator assembly comprising multiple phases of coil windings. The battery is connected to the inverter. When the electric vehicle is in the driven state, the battery is connected to the coil windings of the motor via the inverter, the direct current output from the battery is converted into the alternating current by the forward operation control of the inverter, and the alternating current is output to the motor and drives the motor to operate. When the electric vehicle is in the charging state, the external three-phase alternating current is connected to the inverter via an input connector, the inverter is utilized as a charging device. The external three-phase alternating current is converted into the direct current by the reverse operation control of the inverter to charge the battery.

In a class of this embodiment, the external three-phase alternating current is first connected to the coil windings of the motor. The coil windings of the motor are further connected to the inverter and utilized as the charging inductors.

In a class of this embodiment, the input connector for inputting the external three-phase alternating current is further connected to a three-phase switch control box, and the motor is connected between the inverter and the three-phase switch control box. When the electric vehicle is in the driven state, one end of each of the coil windings of the motor is connected to the inverter, and the other ends of the coil windings are in short circuit connection by controlling the three-phase switch control box. When the electric vehicle is in the charging state, one end of each of the coil windings of the motor is connected to the inverter, and the other end of each of the coil windings is connected to the input connector by controlling the three-phase switch control box. The external three-phase alternating current passes through the coil windings of the motor and enters the inverter.

In a class of this embodiment, a phase number of the coil windings of the motor is 3N, and N represents an integer.

In a class of this embodiment, a number of the inverters is N, and each inverter is connected to every three-phase coil windings of the motor.

In a class of this embodiment, N is equal to 3, the motor is a nine-phase motor, and three inverters are configured. One end of every three-phase coil windings are in short circuit connection and further connected to an external one-phase alternating current, and the other end of every three-phase coil windings is connected to one inverter.

In a class of this embodiment, the inverter comprises a microprocessor unit, a driving circuit unit, an IGBT module, and a detection circuit. The detection circuit detects operation parameters of the motor and transmits the operation parameters of the motor to the microprocessor unit. The microprocessor unit outputs a control signal to the driving circuit unit. The driving circuit unit controls the IGBT module so as to control the 3N phases of the coil windings of the motor for normal commutation.

In a class of this embodiment, the forward operation control of the inverter comprises detecting phase currents of the coil windings of the motor and rotor positions, and controlling the current of the motor to drive the rotor of the motor to rotate. The reverse operation control of the inverter comprises detecting the phase currents of the coil windings of the motor and a terminal voltage of the external three-phase alternating current, and converting the three-phase alternating current into the direct current to charge the battery.

In a class of this embodiment, the three-phase switch control box comprises mechanical switches JK. When the electric vehicle is in the driven state, one end of each of the coil windings of the motor is connected to the inverter, and the mechanical switches JK are connected to enable the other ends of the coil windings to be in the short circuit connection. When the electric vehicle is in the charging state, the other end of each of the coil windings is connected to the input connector so that the external three-phase alternating current passes through the coil windings of the motor and enters the inverter. The mechanical switches JK are disconnected by controlling the three-phase switch control box so that the other ends of the coil windings are unable to be in the short circuit connection.

In a class of this embodiment, the three-phase switch control box is connected to a manage control unit. The manage control unit detects whether the three-phase switch control box is connected to a power supply of the external three-phase alternating current. The manage control unit communicates with the inverter. When the manage control unit detects that the external three-phase alternating current is not input into the three-phase switch control box, the manage control unit sends a signal to the inverter that the electric vehicle is in the driven state. The manage control unit controls the three-phase switch control box to enable the three-phase coil windings of the motor to be in the short circuit connection, the direct current output from the battery is converted into the three-phase alternating current via the forward operation control of the inverter, and the three-phase alternating current is output to the motor and drives the motor to operate. When the manage control circuit detects that the external three-phase alternating current is input into three-phase switch control box, the manage control unit sends a signal to the inverter that the electric vehicle is in the charging state. The three-phase coil windings are connected to the power supply of the external three-phase alternating current by controlling the three-phase switch control box, and the external three-phase alternating current is converted into the direct current via the reverse operation control of the inverter to charge the battery.

In a class of this embodiment, the battery is further connected to a battery manage system BMS. The battery manage system communicates with the inverter.

The three-phase switch control box comprises three relay switches and a driving circuit of relay windings.

The three-phase switch control box comprises six IGBTs, and every two IGBTs forms a switch. Emitters of every two IGBTs are connected. A collector of an upper IGBT of every two IGBTs is connected to a power supply of an external one-phase alternating current, and the collector of a lower IGBT of every two IGBTs is connected to a lead wire in parallel connection with each of the three-phase coil windings of the motor. Bases of the IGBTs are respectively connected to control signals.

In a class of this embodiment, the three-phase switch control box comprises three switches that are able to disconnect one end of the three-phase coil windings of the motor from each other or enable one end of the three-phase of the coil windings of the motor to be in the short circuit connection. The three switches are mechanical switches.

In a class of this embodiment, the three switches are electromagnetic relay contactors.

In a class of this embodiment, the three-phase switch control box comprises three switches that are able to disconnect one end of the three-phase coil windings of the motor from each other or enable one end of the three-phase coil windings of the motor to be in the short circuit connection. The three switches are electronic switches.

In a class of this embodiment, the electronic switches are the IGBT module. The IGBT module comprises six IGBTs, and each switch is formed by every two IGBTs. Emitters of every two IGBTs are connected. A collector of one end of every two IGBTs is connected to a power supply of an external one-phase alternating current, and the collector of the other end of every two IGBTs is connected to a lead wire of each of the three-phase coil windings. A base electrode of each IGBT is respectively connected to a control signal.

In a class of this embodiment, the manage control unit comprises: a transformer, a voltage transducer, a rectifier circuit, and a DC-DC circuit. The transformer is connected to the power supply of the external three-phase alternating current for acquiring a power signal. The power signal is detected by the voltage transducer and then output for feedback. The power signal outputs a path of a charging awakening signal to the inverter via the rectifier circuit and the DC-DC circuit and outputs another path of a switch control signal to the three-phase switch control box. The inverter returns a switch control signal to the rectifier circuit and the DC-DC circuit.

Advantages of the electric vehicle and the method of driving and charging the same according to embodiments of the invention are summarized as follows:

1) When the electric vehicle is in the charging state, the external three-phase alternating current is input into the inverter and converted into the direct current by the reverse operation control of the inverter to charge the battery. The inverter functions as a charging device, and therefore no additional independent charging device or charging inductor adopted in the conventional vehicle is required. Thus, the electric vehicle of the invention has small volume, simple structure, and low production cost.

2) In the charging state of the electric vehicle of the invention, the inverter functions as the charging device. The charging procedure is based on the reverse operation of the inverter. Thus, the structure is much simple, and only the control program of the reverse operation of the inverter is required, the control is much simple, and the production cost is much lower.

3) The motor driving system, i.e., the reverse operation of the inverter is able to charge the electric vehicle with the external three-phase alternating current in three phases of full power charging mode. Thus, the charging efficiency of the method of the invention is much higher than those adopting the signal-phase charging devices or diode rectifier.

4) When the electric vehicle is in the charging state, the external three-phase alternating current is input into the coil windings of the motor via the inverter. The coil windings and the stator core of the motor form the inductor, and no additional charging inductor is needed, so that the production cost and the occupied space are saved, and the structure is simplified.

5) The electric vehicle of the invention is connected to the power supply of the external three-phase alternating current via the three-phase switch control box, in which, the motor is connected between the inverter and the three-phase switch control box, or the three-phase switch control box is connected between the inverter and the motor. When the electric vehicle is in the driven state, one end of each of the three-phase coil windings of the motor is connected to the inverter, and the other ends of the three-phase coil windings are in short circuit connection by controlling the three-phase switch control box. The direct current output from the battery is converted into the three-phase alternating current by the forward operation control of the inverter, and the three-phase alternating current is output to the motor and drives the motor to operate. When the electric vehicle is in a charging state, one end of each of the three-phase coil windings of the motor is connected to the inverter, and the other end of each of the three-phase coil windings is connected to the input connector of the three-phase alternating current by controlling the three-phase switch control box. The external three-phase alternating current is converted by a reverse operation control of the inverter into the direct current to charge the battery. Thus, the inverter and the charging device can be automatically switched, and the operation is convenient.

6) The three-phase switch control box of the electric vehicle is connected to the manage control unit for detecting whether the three-phase switch control box is connected to the power supply of the external three-phase alternating current. The manage control unit communicates with the inverter. The manage control unit is able to automatically control the action of the three-phase switch control box and sends the signal to the inverter whether the electric vehicle is in the driven state or the charging state, so that the inverter is switched to the corresponding control mode, and the control is simple and reasonable.

7) The electric vehicle of the invention adopts three inverters and the motor configured with nine phases of the coil windings. Every three-phase coil windings are driven by one inverter. The battery is connected to the input terminal of the inverter. One end of each of the nine phases of the coil windings is connected to one end of each inverter, and the other end of each of the nine phases of the coil windings is connected to the power supply of the external three-phase alternating current. Thus, the three-phase switch control box is not required, the structure is much simpler, and the production cost is much lower.

8) The three-phase switch control box comprises the mechanical switches JK. When the electric vehicle is in the driven state, one end of each of the coil windings of the motor is connected to the inverter, and the mechanical switches JK are connected to enable the other ends of the coil windings to be in the short circuit connection. When the electric vehicle is in the charging state, the other ends of the coil windings are respectively connected to the input connector, so that the external three-phase alternating current passes through the coil windings of the motor and enters the inverter. The mechanical switches JK can be disconnected by controlling the three-phase switch control box, so that the other ends of the coil windings are unable to be in the short circuit connection, the short circuit is avoided, and the safety and operability are much better.

BRIEF DESCRIPTION OF THE DRAWINGS

The invention is described hereinbelow with reference to the accompanying drawings, in which.

DETAILED DESCRIPTION OF THE EMBODIMENTS

For further illustrating the invention, experiments detailing an electric vehicle and a method of driving and charging the same are described below. It should be noted that the following examples are intended to describe and not to limit the invention.

Example 1

Figure 1:
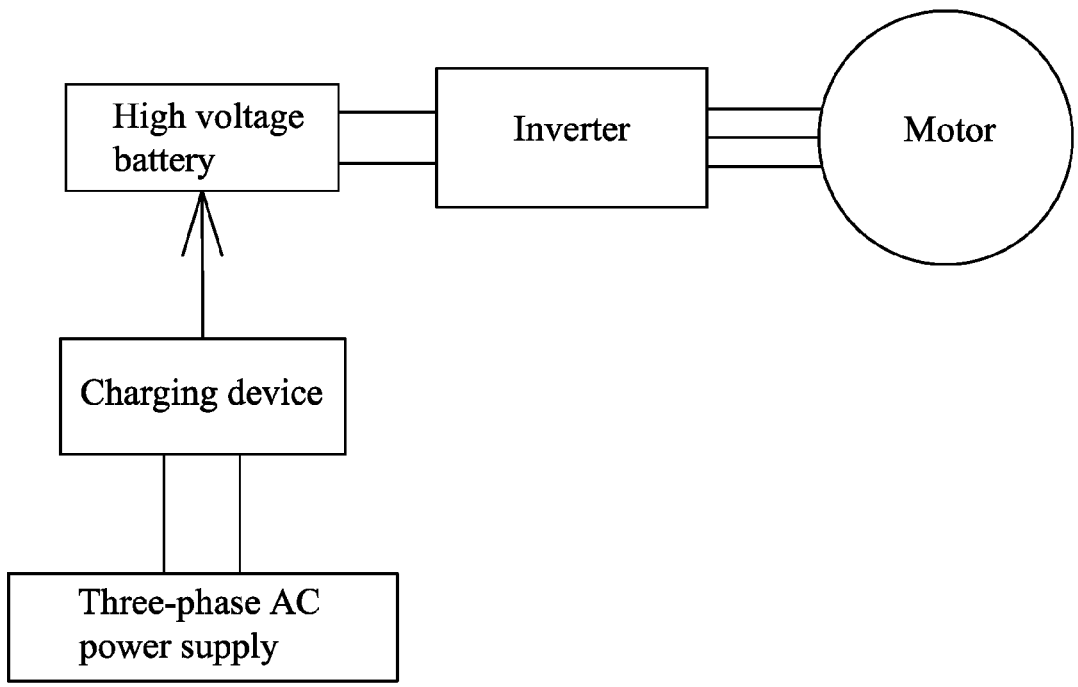
FIG. 1 is a circuit schematic diagram of a first method of charging an electric vehicle in the prior art.
Figure 2:
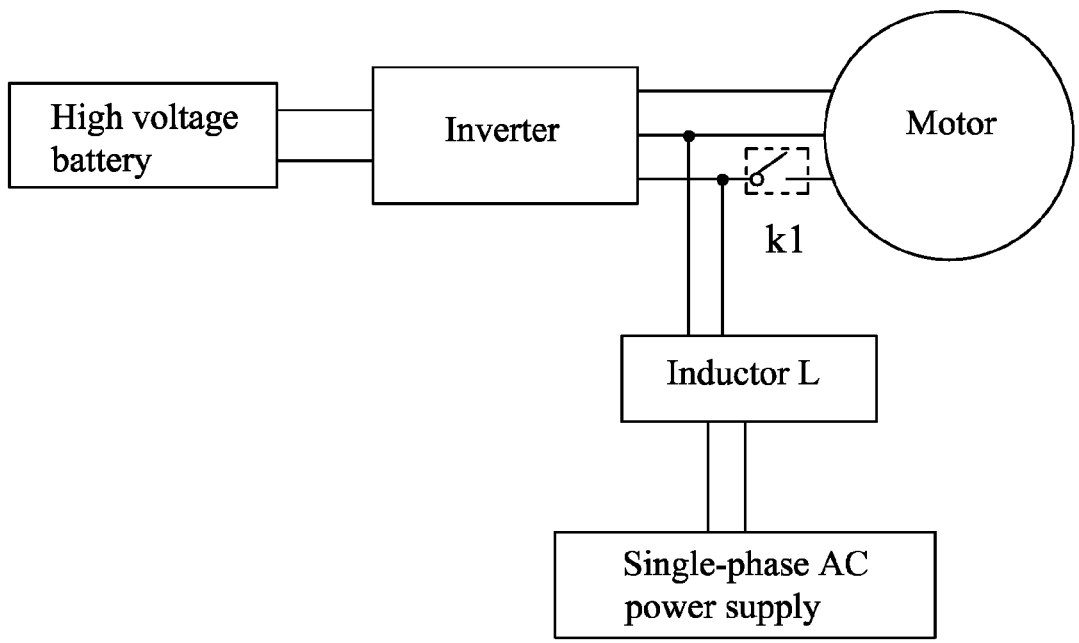
FIG. 2 is a circuit schematic diagram of a second method of charging an electric vehicle in the prior art.
Figure 3:
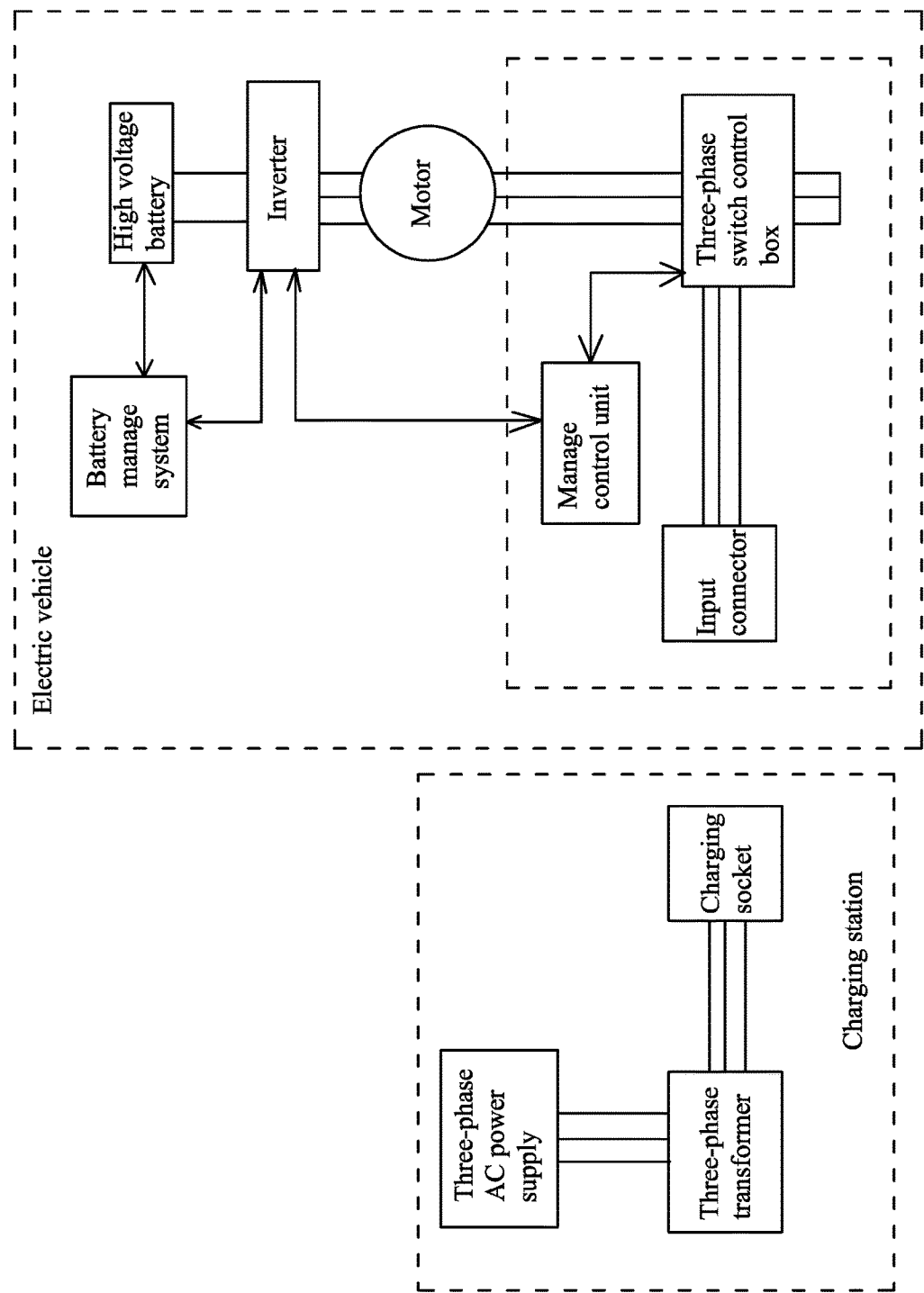
FIG. 3 is a circuit schematic diagram of a method of charging an electric vehicle in accordance with Example 1.

As shown in FIG. 3, an electric vehicle comprises: a high voltage battery, an inverter, and a motor. The motor comprises a stator assembly and a rotor assembly. The stator assembly comprises three-phase coil windings. The high voltage battery is connected to the inverter. The electric vehicle further comprises a three-phase switch control box. The three-phase switch control box is connected to an input connector of a three-phase alternating current. The input connector is configured to input an external three-phase alternating current. The motor is connected between the inverter and the three-phase switch control box, and the input connector of the three-phase alternating current is connected to a charging socket configured in a charging station.

When the electric vehicle is in a driven state, one end of each of the three-phase coil windings of the motor is connected to the inverter, and the other ends of the three-phase coil windings are in short circuit connection by controlling the three-phase switch control box. A high voltage direct current output from the high voltage battery is converted into a three-phase alternating current by a forward operation control of the inverter, and the three-phase alternating current is output to the motor and drives the motor to operate.

Figure 7:
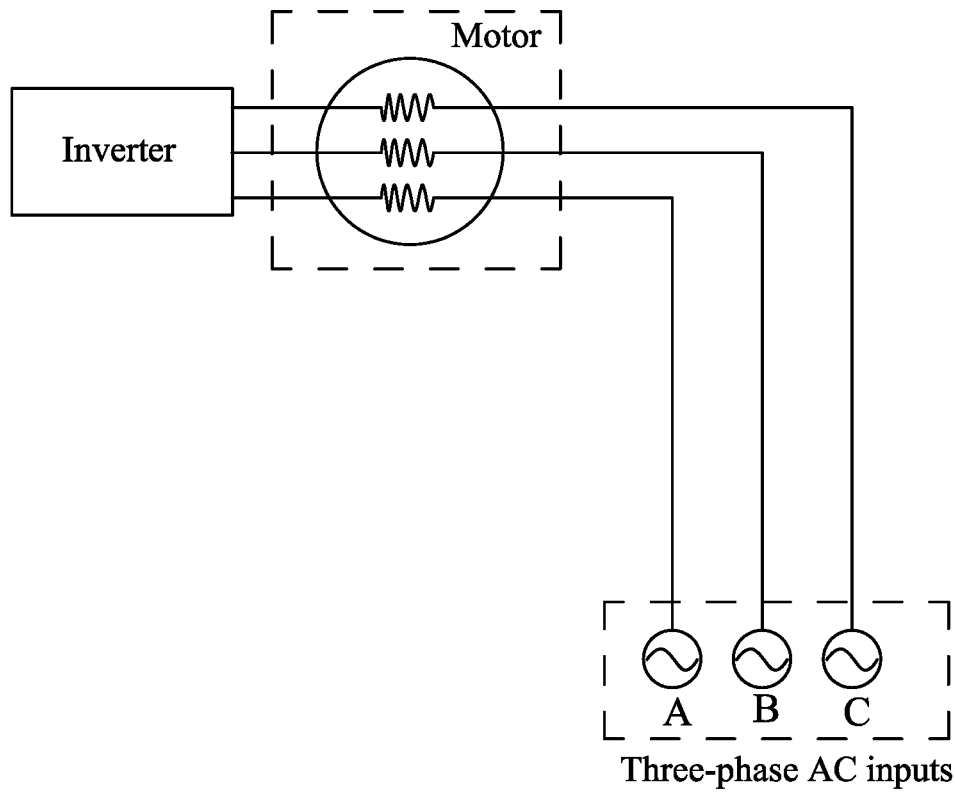
FIG. 7 is an electrical connection diagram of a charging state of a method of charging an electric vehicle in accordance with Example 1.

As shown in FIGS. 3 and 7, when the electric vehicle is in a charging state, one end of each of the three-phase coil windings of the motor is connected to the inverter, and the other end of each of the three-phase coil windings is connected to the input connector of the three-phase alternating current by controlling the three-phase switch control box. The external three-phase alternating current passes through the three-phase coil windings of the motor, which are utilized as charging inductors, then enters the inverter, and converted into the high voltage direct current to charge the high voltage battery by a reverse operation control of the inverter.

Figure 4:
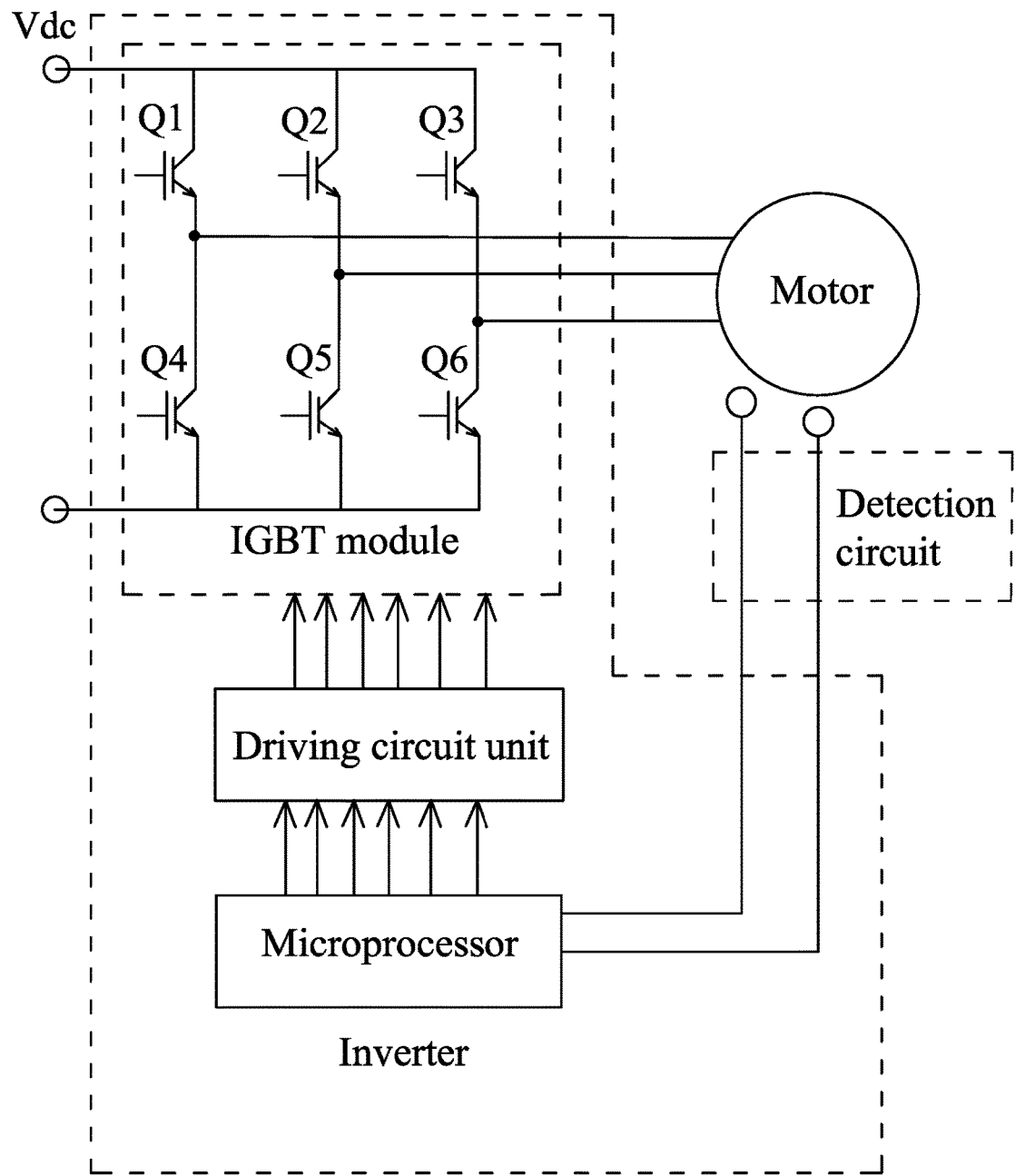
FIG. 4 is a circuit schematic diagram of an inverter in accordance with one embodiment of the invention.

As shown in FIG. 4, the inverter comprises: a microprocessor, a driving circuit unit, an IGBT module, and a detection circuit. The detection circuit detects operation parameters of the motor and transmits the operation parameters of the motor to the microprocessor unit. The microprocessor unit outputs a control signal to the driving circuit unit. The driving circuit unit controls the IGBT module so as to control the three-phase coil windings of the motor for normal commutation. The IGBT module is configured with six electronic switches Q1, Q2, Q3, Q4, Q5, and Q6 that form three bridge arms. Each bridge arm is respectively connected to one phase of the coil winding (U, V, and W).

The forward operation control of the inverter refers to commutation operation of each phase of the coil windings of the motor by detecting the currents of the coil windings of the motor and the rotor position parameters, so as to convert the high voltage direct current into the three-phase alternating current. The detection circuit detects and transmits the currents of the coil windings of the motor and the rotor position parameters to the microprocessor unit. The microprocessor then outputs six paths of PWM signals to the driving circuit unit according to the currents of the coil windings of the motor and the rotor position parameters, and the driving circuit unit controls connection or disconnection of the electronic switches Q1, Q2, Q3, Q4, Q5, and Q6. The forward operation of the inverter, i.e., the commutation driving parts of the permanent magnet motor, has been specifically disclosed in textbooks or patent documents. The rotor position parameters are measured by a rotary transformer, and the currents of the coil windings of the motor are measured by a current sensor.

The reverse operation control of the motor comprises detecting the currents of the coil windings of the motor and a terminal voltage of the external three-phase alternating current to convert the external three-phase alternating current into the direct current to charge the high voltage battery. Similarly, the detection circuit detects and transmits the currents of the windings of the motor and the terminal voltage of the external three-phase alternating current to the microprocessor unit. The microprocessor unit outputs six paths of PWM signals to the driving circuit unit according to the currents of the windings of the motor and the terminal voltage of the external three-phase alternating current. The electronic switches Q1, Q2, Q3, Q4, Q5, and Q6 are connect by turns under the control of the driving circuit unit, thereby enabling the high voltage direct current to pass through the electronic switches and to charge the high voltage battery. The reverse operation control of the motor can be realized by establishing a control program of reverse charging, i.e., the control program of the reverse charging is different from the forward operation control program.

As shown in FIG. 3, the three-phase switch control box is connected to a manage control unit. The manage control unit detects whether the three-phase switch control box is connected to a power supply of the external three-phase alternating current. The manage control unit communicates with the inverter. When the manage control unit detects that the external three-phase alternating current is not input into the three-phase switch control box, the manage control unit sends a signal to the inverter that the electric vehicle is in the driven state. The manage control unit controls the three-phase switch control box to enable the other ends of the three phase of the coil windings of the motor to be in the short circuit connection, the high voltage direct current output from the high voltage battery is converted into the three-phase alternating current via the forward operation control of the inverter, and the three-phase alternating current is output to the motor so as to drive the motor to operate. When the manage control circuit detects that the external three-phase alternating current is input into three-phase switch control box, the manage control unit sends a signal to the inverter that the electric vehicle is in the charging state. The three-phase coil windings are connected to the power supply of the external three-phase alternating current by controlling the three-phase switch control box, and the external three-phase alternating current is converted into the high voltage direct current by the reverse operation control of the inverter for charging the high voltage battery.

The high voltage battery is further connected to a battery manage system BMS for communicating with the inverter.

Figure 5:
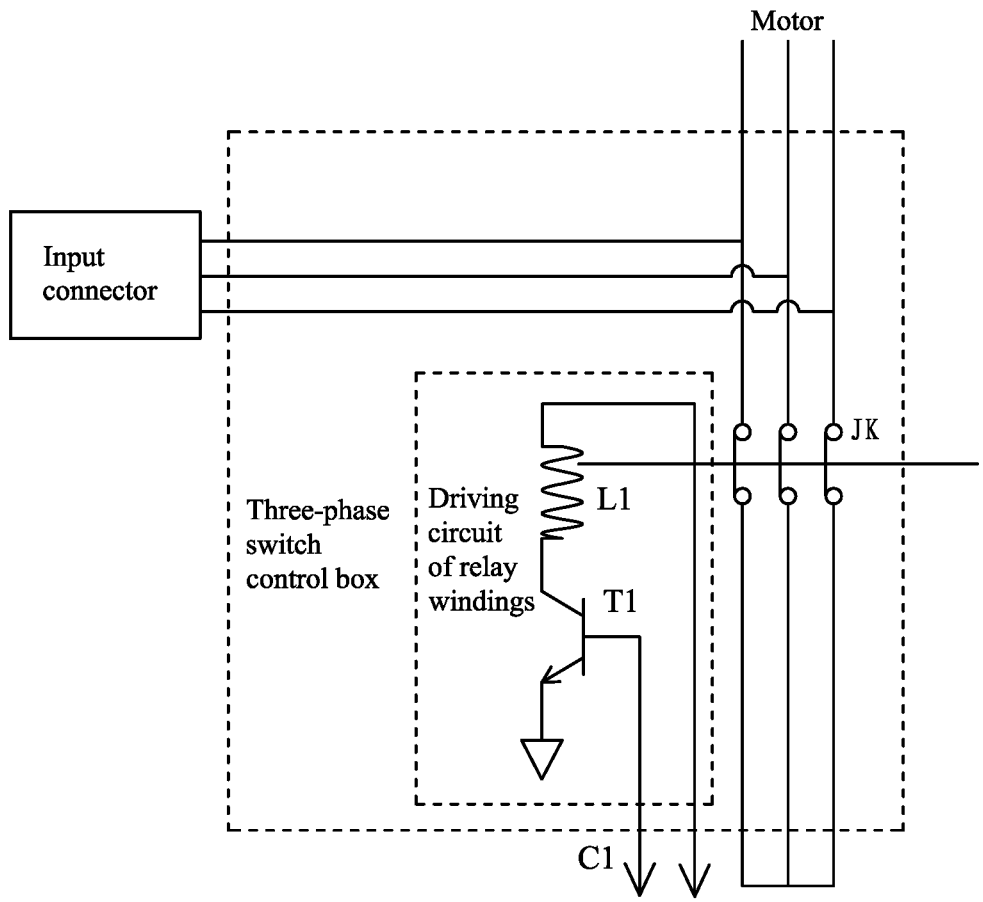
FIG. 5 is an electrical schematic diagram of a three-phase switch control box adopting a mechanical switch in accordance with Example 1.

As shown in FIG. 5, the three-phase switch control box comprises mechanical switches JK. When the electric vehicle is in the driven state, one end of each of the coil windings of the motor is connected to the inverter, and the mechanical switches JK are connected to enable the other ends of the coil windings to be in the short circuit connection. When the electric vehicle is in the charging state, the other ends of the coil windings are respectively connected to the input connector. The external three-phase alternating current passes through the coil windings of the motor and enters the inverter. The mechanical switches JK can be disconnected by controlling the three-phase switch control box, so that the other ends of the coil windings are unable to be in the short circuit connection.

Figure 8:
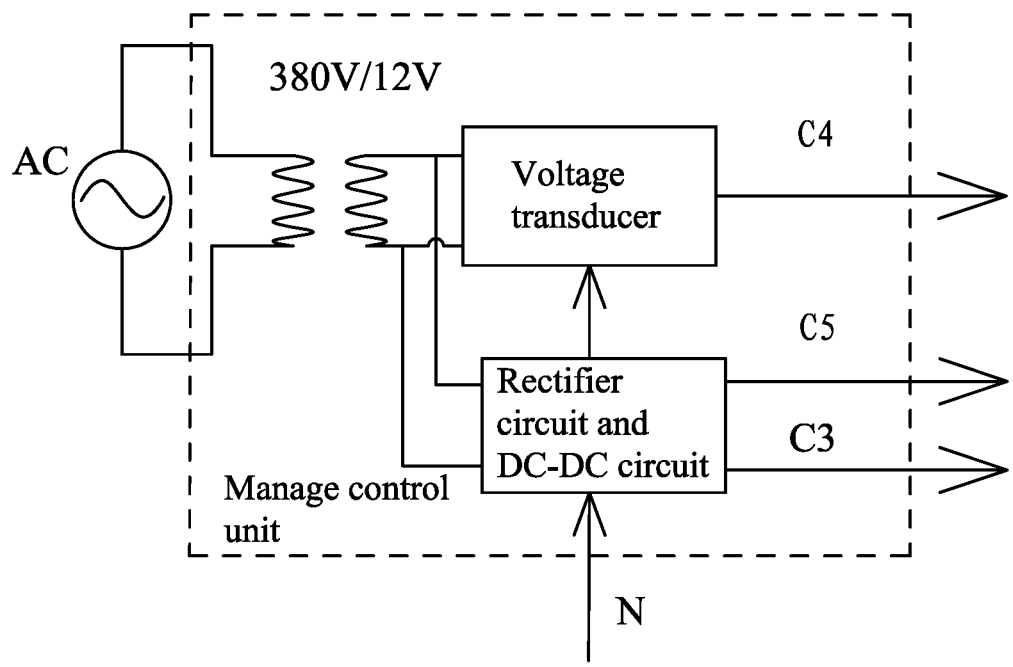
FIG. 8 is a circuit schematic diagram of a manage control unit in accordance with one embodiment of the invention.

To make the switch of the inverter between the driving mode and the charging mode much safer and more reliable, the voltage of the power supply of the external three-phase alternating current must be monitored/measured, as shown in FIG. 8.

A) Prior to driving, the PWM inverter is in a closed state, the input connector of the external three-phase alternating current is disposed at a side of the electric vehicle. The input connector is kept in the absence of the voltage, or else the input connector is detected to be connected to the external three-phase alternating current and the vehicle cannot be started. Besides, the mechanical switches JK are connected by controlling the three-phase switch control box so as to enable the other ends of the coil windings to be in the short circuit connection, which satisfies the normal starting procedure of the vehicle.

B) In the starting of the charging mode, the high voltage battery must be connected to the inverter. The PWM inverter is in the closed state. The mechanical switches JK are disconnected by controlling the three-phase switch control box, so that the other ends of the coil windings are respectively connected to the input connector, and the external three-phase alternating current passes through the coil windings of the motor and enters the inverter. Voltage must exist at the terminal of the input connector of the external three-phase alternating current, as shown in FIG. 8, or else the external three-phase alternating current is not connected. A feedback signal of an alternating current power supply is shown in FIG. 8. In the charging mode, the terminal voltage signal of the external three-phase alternating signal is substituted by a signal of a rotary transformer for driving control.

Figure 6:
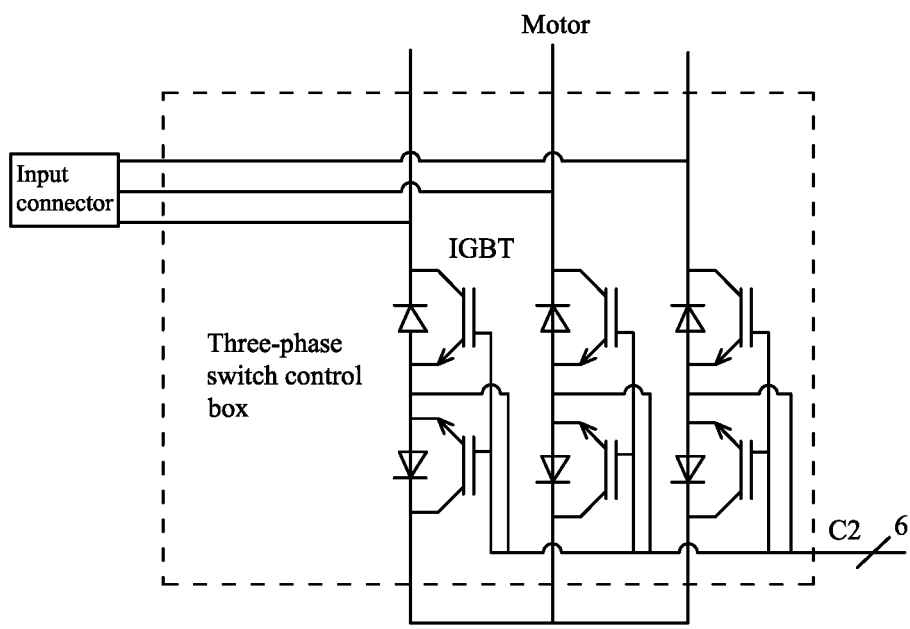
FIG. 6 is an electrical schematic diagram of a three-phase switch control box adopting an electronic switch in accordance with Example 1.

As shown in FIG. 6, the three-phase switch control box adopts electronic switches comprising six IGBTs. Each switch is formed by every two IGBTs. Emitters of every two IGBTs are connected. A collector of an upper IGBT of every two IGBTs is connected to the power supply of the external one-phase alternating current, and the collector of a lower IGBT of every two IGBTs is connected to a lead wire in parallel connection with each of the three-phase coil windings of the motor. Bases of the IGBTs are respectively connected to control signals C2. A power switch is optionally configured on a rear part of the input connector of the three-phase alternating current. The power switch is a mechanical switch with a normally open contact.

As shown in FIG. 8, the manage control unit comprises: a transformer, a voltage transducer, a rectifier circuit, and a DC-DC circuit. The transformer is connected to the power supply of the external three-phase alternating current for acquiring a power signal C4. The power signal C4 is detected by the voltage transducer and then output for feedback. The power signal C4 outputs a path of a charging awakening signal C5 to the inverter via the rectifier circuit and the DC-DC circuit and outputs another path of a switch control signal C3 to the three-phase switch control box. The inverter returns a switch control signal N to the rectifier circuit and the DC-DC circuit. The transformer is a 380 V/12 V transformer.

Example 2

Figure 9:
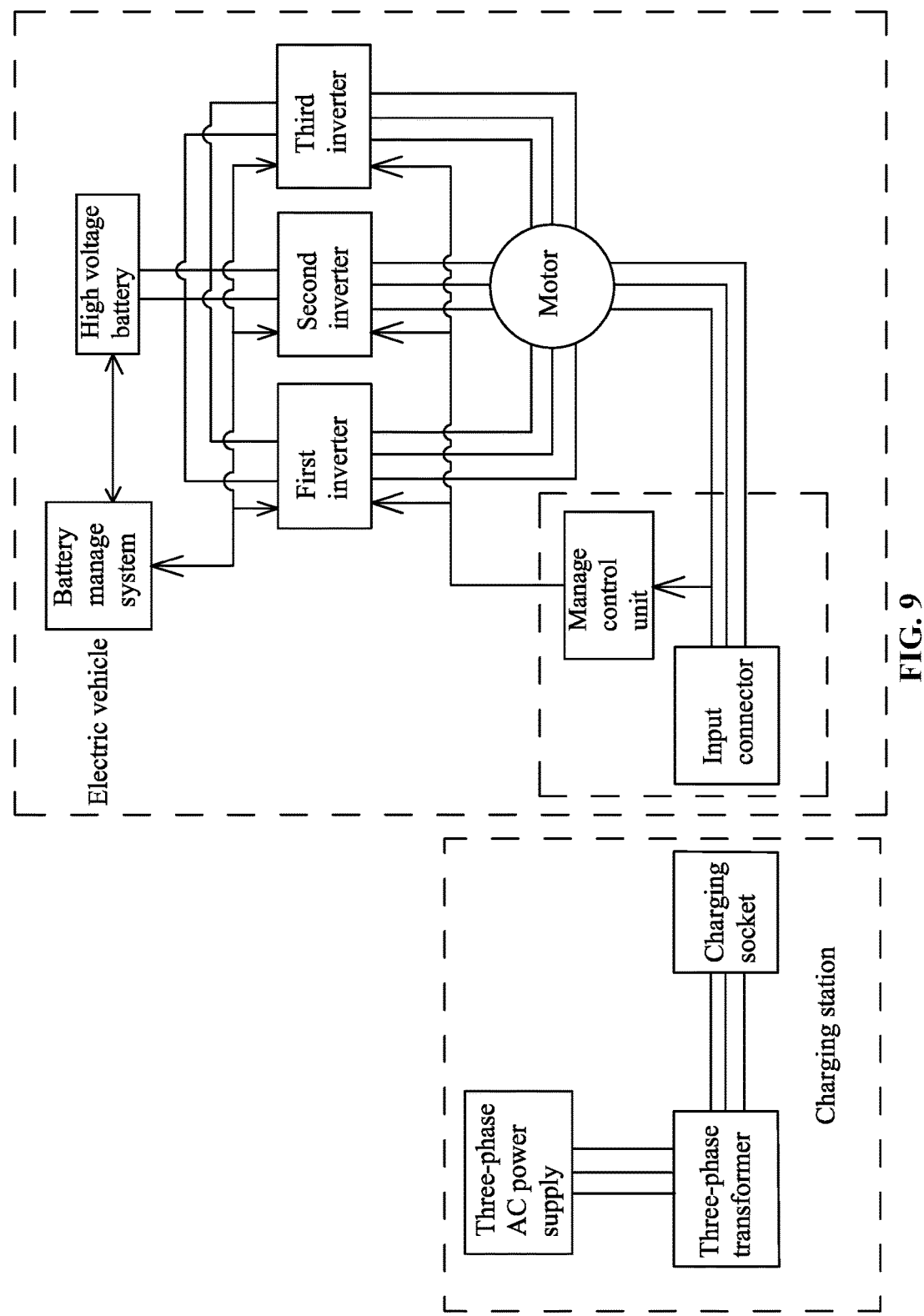
FIG. 9 is a circuit schematic diagram of a method of charging an electric vehicle in accordance with Example 1.

As shown in FIG. 9, an electric vehicle comprises: a high voltage battery, three inverters, and a motor. The motor comprises a stator assembly and a rotor assembly. The stator assembly is configured with nine phases of coil windings, and every three-phase coil windings are driven by each inverter. The high voltage battery is connected to an input terminal of the inverter. One end of each of the nine phases of the coil windings is connected to one end of each of the three inverters, and the other end of each of the nine phases of the coil windings is connected to a power supply of an external three-phase alternating current.

Figure 10:
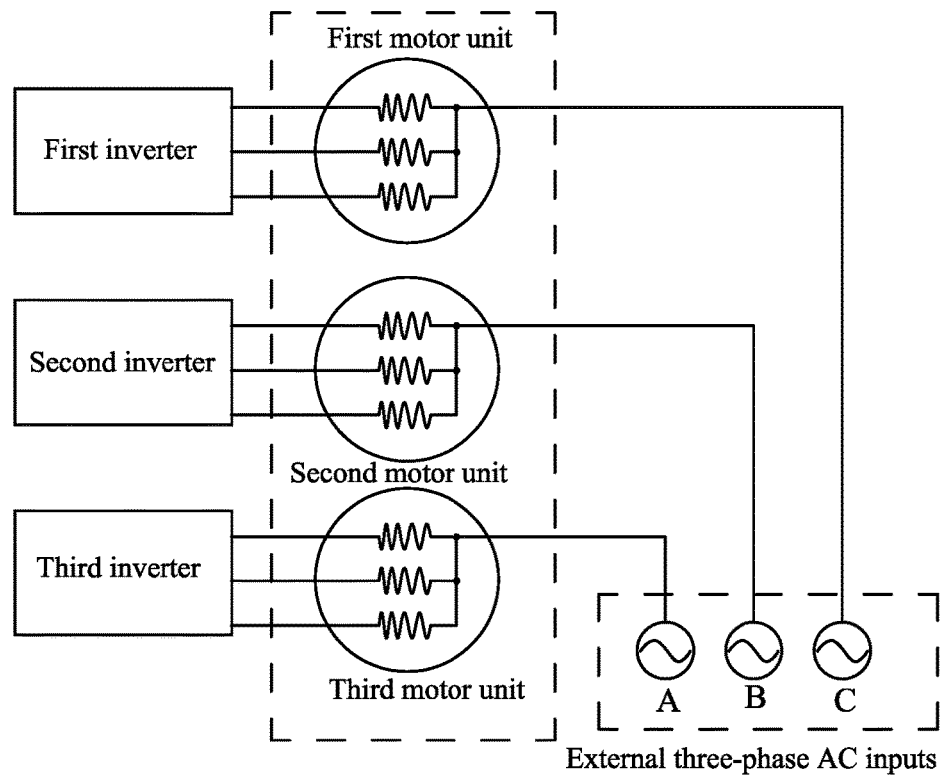
FIG. 10 is a circuit diagram showing connection between three inverters and motor units in accordance with Example 2.

As shown in FIG. 10, the stator assembly is configured with the nine phases of the coil windings, and every three-phase coil windings are driven by one inverter. The other ends of every three-phase coil windings connected to the same inverter firstly are in short circuit connection and are then connected to one phase of alternating input of the three-phase alternating current. An input connector of the three-phase alternating current inputs the external three-phase alternating current. The high voltage battery is further connected to a battery manage system BMS. The battery manage system BMS communicates with the three inverters. The inverter is connected to a manage control unit for detecting whether the external three-phase alternating current is input.

In FIG. 10, three inverters (a first inverter, a second inverter, and a third inverter) are indicated. Each inverter together with every three-phase coil windings of the motor forms a motor unit (i.e., a first motor unit, a second motor unit, a third motor unit). In the driven state, each inverter drives and controls three-phase coil windings. In the charging state, each phase of the alternating current is input to every three-phase coil windings and then enters one inverter. The inverter converts the phase of the alternating current into the high voltage direct current by the reverse operation control to charge the high voltage battery. Such connection is able to omit the three-phase switch control box, thereby saving the production cost.

As shown in FIG. 4, the inverter comprises: a microprocessor, a driving circuit unit, an IGBT module, and a detection circuit. The detection circuit detects operation parameters of the motor and transmits the operation parameters of the motor to the microprocessor unit. The microprocessor unit outputs a control signal to the driving circuit unit. The driving circuit unit controls the IGBT module so as to control the three-phase coil windings of the motor for normal commutation. The forward operation control of the inverter comprises detecting phase currents of the coil windings of the motor and rotor positions, and controlling the current of the motor to drive the rotor of the motor to rotate. The reverse operation control of the inverter comprises detecting the phase currents of the coil windings of the motor and a terminal voltage of the external three-phase alternating current, and converting the three-phase alternating current into the direct current to charge the battery.

Figure 11:
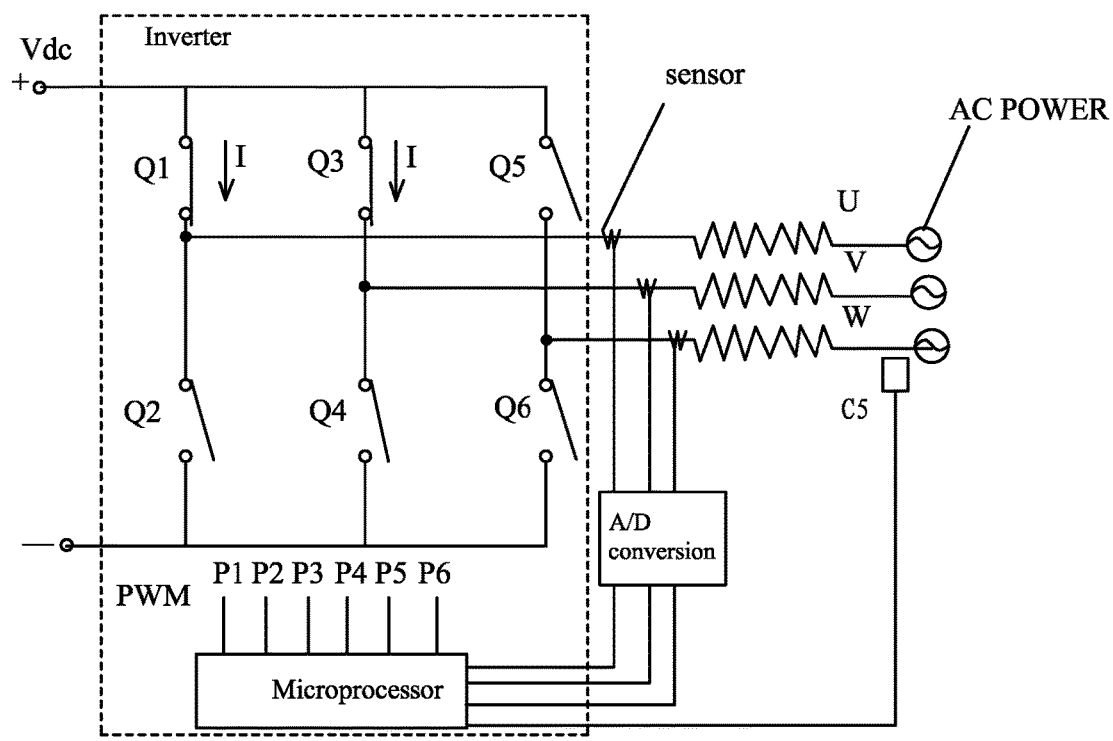
FIG. 11 is a schematic diagram of a reverse operation control of an inverter in accordance with one embodiment of the invention.
Figure 12:
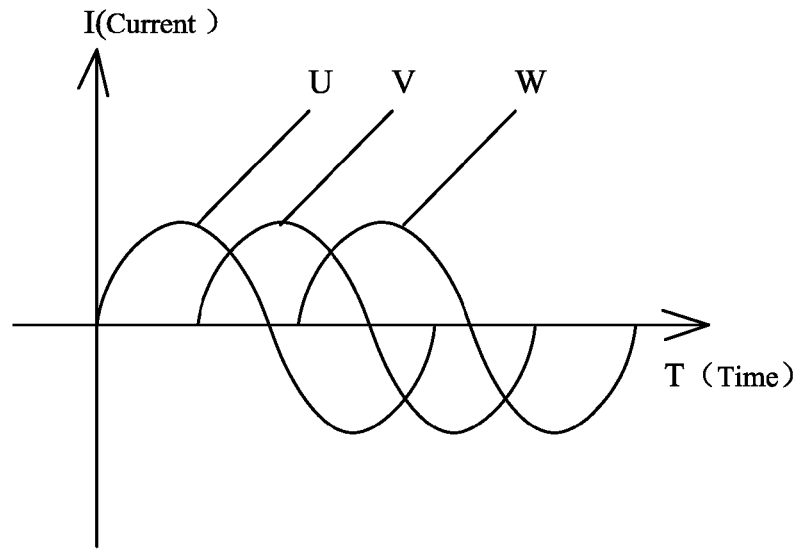
FIG. 12 is an oscillogram showing currents passing through each phase of the coil windings in a charging state of an electric vehicle in accordance with one embodiment of the invention.

The reverse operation control of the inverter refers to the commutation operation of each phase of the coil winding of the motor, as shown in FIGS. 11-12, a current mutual inductor or current sensor of each phase of the coil winding (U, V, and W) of the motor detects the current state of each phase of the coil winding. As we all known that the input three-phase AC power is a sine wave current with different phases existing with a 120° of an electric angle difference and comprises an A-phase, a B-phase, and a C-phase. The current mutual inductor or current sensor detects the phase current of each phase of the coil winding and the terminal voltage of the external three-phase alternating current and transmits the phase current of each phase of the coil winding and the terminal voltage of the external three-phase alternating current to the microprocessor by A/D conversion. The microprocessor unit outputs six paths of PWM signals (P1, P2, P3, P4, P5, and P6) to the driving circuit unit. The electric switch tubes Q1, Q2, Q3, Q4, Q5, and Q6 are connect by turns under the control of the driving circuit unit, thereby enabling the high voltage direct current to pass through the electric switch tubes and to charge the high voltage battery. When the microprocessor unit detects that the U-phase coil winding is in a positive half period, the electric switch tube Q1 is connected, and when the microprocessor units detects that the U-phase coil winding is in a negative half period, the electric switch tube Q2 is connected. When the microprocessor unit detects that the V-phase coil winding is in the positive half period, the electric switch tube Q3 is connected, and when the microprocessor units detects that the V-phase coil winding is in the negative half period, the electric switch tube Q4 is connected. When the microprocessor unit detects that the W-phase coil winding is in the positive half period, the electric switch tube Q5 is connected, and when the microprocessor units detects that the W-phase coil winding is in the negative half period, the electric switch tube Q6 is connected. Compared with the conventional diode rectification, the reverse operation control of the inverter of the invention is advantageous in that the control of the charging can be realized by the connection or disconnection of the switch, thus the energy loss is very small, the efficiency is high, and the charging is fast. In addition, the terminal voltage signal C5 of the external three-phase alternating current is sent to the microprocessor of the inverter, and the microprocessor conducts the reverse operation control according to the terminal voltage of the three-phase alternating current and the phase current of each phase of the coil windings of the motor.

Example 3

A method of charging an electric vehicle is illustrated in this example. The electric vehicle comprises: a high voltage battery, an inverter, and a motor. When the electric vehicle is in a driven state, a high voltage direct current output from the high voltage battery is converted into the three-phase alternating current by a forward operation control of the inverter, and the three-phase alternating current is output to the motor and drives the motor to operate. When the electric vehicle is in a charging state, an external three-phase alternating current is input into the inverter via three charging inductors and converted into the direct current by a reverse operation control of the inverter to charge the high voltage battery.

The three charging inductors are formed by the three-phase coil windings of the motor, and the coil windings of the motor are utilized as the charging inductors.

The forward operation control of the inverter comprises detecting phase currents of the coil windings of the motor and rotor positions, and controlling the current of the motor to drive the rotor of the motor to rotate. The reverse operation control of the inverter comprises detecting the phase currents of the coil windings of the motor and a terminal voltage of the external three-phase alternating current, and converting the three-phase alternating current into the direct current to charge the battery.

A phase number of the coil winding of the motor is 3N, and N represents an integer.

A number of the inverters is N, and each inverter is correspondingly connected to three coil windings of the motor.

Examples 4-11

Figure 13:
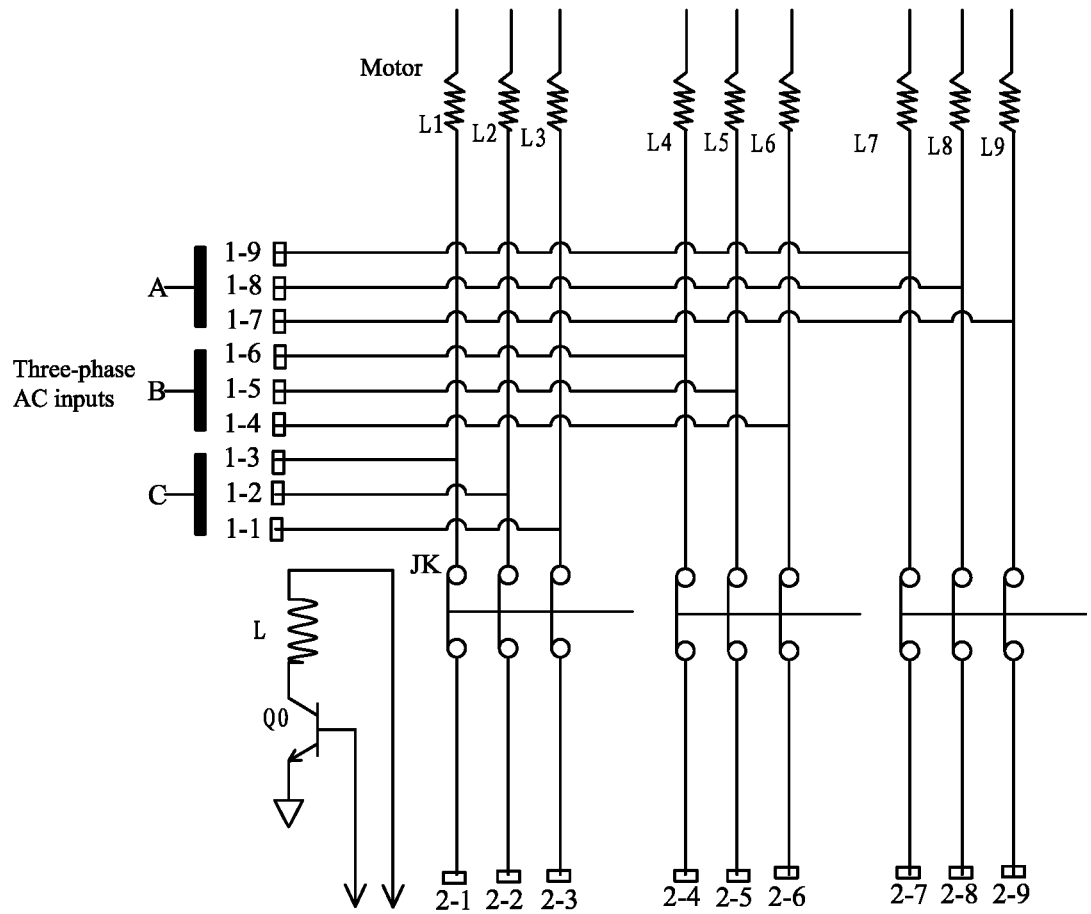
FIG. 13 is a circuit schematic diagram of a method of charging an electric vehicle in accordance with Examples 4-11.

Multiple of embodiments for carrying out the invention can be acquired based on FIG. 13, in which, three-phase alternating current inputs (A, B, and C phases) are disposed in the charging socket. The motor is configured with nine phases of coil windings L1, L2, L3, L4, L5, L6, L7, L8, and L9, a high voltage battery, inverters, nine charging contacts 1-1, 1-2, 1-3, 1-4, 1-5, 1-6, 1-7, 1-8, and 1-9, and nine driving contacts 2-1, 2-2, 2-3, 2-4, 2-5, 2-6, 2-7, 2-8, and 2-9, switchable relay switches JK, and a driving circuit for controlling the connection and disconnection of the relay switches JK. The driving circuit comprises a triode and a relay winding L. The nine charging contacts 1-1, 1-2, 1-3, 1-4, 1-5, 1-6, 1-7, 1-8, and 1-9 functions as the input connector as shown in FIG. 3.

Hereinbelow, a concept of common configuration is introduced. When the driving contacts are closed, the alternating current power supply is disconnected from the coil windings of the motor; and when the charging contacts are connected to the alternating current power supply, the driving contacts are disconnected. A total of seven possible configurations are listed as follows:

1) Configuration of a motor: the charging contacts 1-1, 1-2, and 1-3 are respectively connected to the three-phase alternating current inputs A, B, and C; and in the driven state, the driving contacts 2-1, 2-2, and 2-3 are in short circuit connection.

2) Configuration of two parallel three-phase asynchronous motors: the charging contacts 1-1 and 1-4 are connected to the A phase of the three-phase AC inputs, the charging contacts 1-2 and 1-5 are connected to the B phase of the three-phase AC inputs, and the charging contacts 1-3 and 1-6 are connected to the C phase of the three-phase AC inputs; and in the driven state, the driving contacts 2-1, 2-2, and 2-3 form the short circuit connection, and the driving contacts 2-4, 2-5, and 2-6 form the short circuit connection.

3) Configuration of a six-phase motor: the charging contacts 1-1 and 1-4 are connected to the A phase of the three-phase AC inputs, the charging contacts 1-2 and 1-5 are connected to the B phase of the three-phase AC inputs, and the charging contacts 1-3 and 1-6 are connected to the C phase of the three-phase AC inputs; and in the driven state, the driving contacts 2-1, 2-2, 2-3, 2-4, 2-5, and 2-6 form the short circuit connection.

4) Configuration of three parallel three-phase asynchronous motors: the charging contacts 1-1, 1-2, and 1-3 are connected to the A phase of the three-phase AC inputs, the charging contacts 1-4, 1-5, and 1-6 are connected to the B phase of the three-phase AC inputs, and the charging contacts 1-7, 1-8, and 1-9 are connected to the C phase of the three-phase AC inputs; and in the driven state, the driving contacts 2-1, 2-2, and 2-3 form the short circuit connection, the driving contacts 2-4, 2-5, and 2-6 form the short circuit connection, and the driving contacts 2-7, 2-8, and 2-9 form the short circuit connection.

5) Configuration of three parallel three-phase asynchronous motors (a second option): the charging contacts 1-1, 1-4, and 1-7 are connected to the A phase of the three-phase AC inputs, the charging contacts 1-2, 1-5, and 1-8 are connected to the B phase of the three-phase AC inputs, and the charging contacts 1-3, 1-6, and 1-9 are connected to the C phase of the three-phase AC inputs; and in the driven state, the driving contacts 2-1, 2-2, and 2-3 form the short circuit connection, the driving contacts 2-4, 2-5, and 2-6 form the short circuit connection, and the driving contacts 2-7, 2-8, and 2-9 form the short circuit connection.

6) Configuration of a nine-phase motor (first option): the charging contacts 1-1, 1-2, and 1-3 are connected to the A phase of the three-phase AC inputs, the charging contacts 1-4, 1-5, and 1-6 are connected to the B phase of the three-phase AC inputs, and the charging contacts 1-7, 1-8, and 1-9 are connected to the C phase of the three-phase AC inputs; and in the driven state, the driving contacts 2-1, 2-2, 2-3, 2-4, 2-5, 2-6, 2-7, 2-8, and 2-9 form the short circuit connection.

6) Configuration of a nine-phase motor (first option): the charging contacts 1-1, 1-4, and 1-7 are connected to the A phase of the three-phase AC inputs, the charging contacts 1-2, 1-5, and 1-8 are connected to the B phase of the three-phase AC inputs, and the charging contacts 1-3, 1-6, and 1-9 are connected to the C phase of the three-phase AC inputs; and in the driven state, the driving contacts 2-1, 2-2, 2-3, 2-4, 2-5, 2-6, 2-7, 2-8, and 2-9 form the short circuit connection.

8) Configuration of a five-phase motor: the charging contacts 1-1 and 1-4 are connected to the A phase of the three-phase AC inputs, the charging contacts 1-2 and 1-5 are connected to the B phase of the three-phase AC inputs, and the charging contact 1-3 is connected to the C phase of the three-phase AC inputs; and in the driven state, the driving contacts 2-1, 2-2, 2-3, 2-4, 2-5 form the short circuit connection. When the electric vehicle is in the driven state, the high voltage direct current output from the high voltage battery is converted into the three-phase alternating current by a forward operation control of the inverter, and the three-phase alternating current is output to the motor and drives the motor to operate. When the electric vehicle is in the charging state, the external three-phase alternating current is input into the inverter via three charging inductors and converted into the direct current by a reverse operation control of the inverter to charge the high voltage battery.

Unless otherwise indicated, the numerical ranges involved in the invention include the end values. While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. An electric vehicle comprising a battery, an inverter, and a motor; the motor comprising a stator assembly and a rotor assembly; the stator assembly comprising at least three phases of coil windings; the battery being connected to the inverter; the electric vehicle being driven and charged using a method, the method comprising:
   a) when the electric vehicle is in a driven state, outputting a direct current by the battery to the inverter, converting the direct current by the inverter into a three-phase alternating current through a forward operation control, and outputting the three-phase alternating current to the motor to drive the motor to operate; and
   b) when the electric vehicle is in a charging state, introducing an external three-phase alternating current to the inverter via three charging inductors, and converting the external three-phase alternating current into the direct current by the inverter through a reverse operation control, and charging the battery with the direct current;
wherein:
   when the electric vehicle is in the driven state, the battery is connected to the coil windings of the motor via the inverter, the direct current output from the battery is converted into the alternating current by the forward operation control of the inverter, and the alternating current is output to the motor and drives the motor to operate;
   when the electric vehicle is in the charging state, the external three-phase alternating current is connected to the inverter via an input connector, the inverter is utilized as a charging device; the external three-phase alternating current is converted into the direct current by the reverse operation control of the inverter to charge the battery;
   the external three-phase alternating current is connected to the coil windings of the motor; the coil windings of the motor are connected to the inverter and utilized as the charging inductors;
   the input connector for inputting the external three-phase alternating current is further connected to a three-phase switch control box, and the motor is connected between the inverter and the three-phase switch control box;
   when the electric vehicle is in the driven state, one end of each of the coil windings of the motor is connected to the inverter, and the other ends of the coil windings are in short circuit connection by controlling the three-phase switch control box;
   when the electric vehicle is in the charging state, one end of each of the coil windings of the motor is connected to the inverter, and the other end of each of the coil windings is connected to the input connector by controlling the three-phase switch control box; and the external three-phase alternating current passes through the coil windings of the motor and enters the inverter;
   the three-phase switch control box comprises switches (JK);
   when the electric vehicle is in the driven state, one end of each of the coil windings of the motor is connected to the inverter, and the switches (JK) are connected to enable the other ends of the coil windings to be in the short circuit connection; and
   when the electric vehicle is in the charging state, the other end of each of the coil windings is connected to the input connector so that the external three-phase alternating current passes through the coil windings of the motor and enters the inverter; the switches (JK) are disconnected by controlling the three-phase switch control box so that the other ends of the coil windings are unable to be in the short circuit connection.

2. The electric vehicle of claim 1, wherein
the three-phase switch control box is connected to a manage control unit; the manage control unit detects whether the three-phase switch control box is connected to a power supply of the external three-phase alternating current; and the manage control unit communicates with the inverter;
when the manage control unit detects that the external three-phase alternating current is not input into the three-phase switch control box, the manage control unit sends a signal to the inverter that the electric vehicle is in the driven state; the manage control unit controls the three-phase switch control box to enable the three-phase coil windings of the motor to be in the short circuit connection, the direct current output from the battery is converted into the three-phase alternating current via the forward operation control of the inverter, and the three-phase alternating current is output to the motor and drives the motor to operate;
when the manage control circuit detects that the external three-phase alternating current is input into three-phase switch control box, the manage control unit sends a signal to the inverter that the electric vehicle is in the charging state; the three-phase coil windings are connected to the power supply of the external three-phase alternating current by controlling the three-phase switch control box, and the external three-phase alternating current is converted into the direct current via the reverse operation control of the inverter to charge the battery.

3. The electric vehicle of claim 2, wherein the battery is further connected to a battery manage system; and the battery manage system communicates with the inverter.

4. The electric vehicle of claim 1, wherein the three-phase switch control box comprises three switches (JK) that are able to disconnect one end of the three-phase coil windings of the motor from each other or enable one end of the three phase of the coil windings of the motor to be in the short circuit connection; and the three switches (JK) are mechanical switches.

5. The electric vehicle of claim 4, wherein the three switches (JK) are electromagnetic relay contactors.

6. The electric vehicle of claim 1, wherein the three-phase switch control box comprises three switches (JK) that are able to disconnect one end of the three-phase coil windings of the motor from each other or enable one end of the three-phase coil windings of the motor to be in the short circuit connection; and the three switches (JK) are electronic switches.

7. The electric vehicle of claim 6, wherein the electronic switches are the IGBT module; the IGBT module comprises six IGBTs, and each switch is formed by every two IGBTs; emitters of every two IGBTs are connected; a collector of one end of every two IGBTs is connected to a power supply of an external one-phase alternating current, and the collector of the other end of every two IGBTs is connected to a lead wire of each of the three-phase coil windings; and a base electrode of each IGBT is respectively connected to a control signal.

8. The electric vehicle of claim 1, wherein a phase number of the coil windings of the motor is 3N, and N represents an integer.

9. The electric vehicle of claim 8, wherein a number of the inverters is N, and each inverter is connected to every three-phase coil windings of the motor.

10. The electric vehicle of claim 1, wherein the inverter comprises a microprocessor unit, a driving circuit unit, an IGBT module, and a detection circuit; the detection circuit detects operation parameters of the motor and transmits the operation parameters of the motor to the microprocessor unit; the microprocessor unit outputs a control signal to the driving circuit unit; the driving circuit unit controls the IGBT module so as to control the 3N phases of the coil windings of the motor for normal commutation.

11. An electric vehicle comprising a battery, an inverter, and a motor; the motor comprising a stator assembly and a rotor assembly; the stator assembly comprising at least three phases of coil windings; the battery being connected to the inverter; the electric vehicle being driven and charged using a method, the method comprising:
  a) when the electric vehicle is in a driven state, outputting a direct current by the battery to the inverter, converting the direct current by the inverter into a three-phase alternating current through a forward operation control, and outputting the three-phase alternating current to the motor to drive the motor to operate; and
  b) when the electric vehicle is in a charging state, introducing an external three-phase alternating current to the inverter via three charging inductors, and converting the external three-phase alternating current into the direct current by the inverter through a reverse operation control, and charging the battery with the direct current;
wherein:
  when the electric vehicle is in the driven state, the battery is connected to the coil windings of the motor via the inverter, the direct current output from the battery is converted into the alternating current by the forward operation control of the inverter, and the alternating current is output to the motor and drives the motor to operate;
  when the electric vehicle is in the charging state, the external three-phase alternating current is connected to the inverter via an input connector, the inverter is utilized as a charging device; the external three-phase alternating current is converted into the direct current by the reverse operation control of the inverter to charge the battery;
  the forward operation control of the inverter comprises detecting phase currents of the coil windings of the motor and rotor positions, and controlling the current of the motor to drive the rotor of the motor to rotate;
  the reverse operation control of the inverter comprises detecting the phase currents of the coil windings of the motor and a terminal voltage of the external three-phase alternating current, and converting the external three-phase alternating current into the direct current to charge the battery; and
  the manage control unit comprises: a transformer, a voltage transducer, a rectifier circuit, and a DC-DC circuit; the transformer is connected to the power supply of the external three-phase alternating current for acquiring a power signal; the power signal is detected by the voltage transducer and then output for feedback; the power signal outputs a path of a charging awakening signal to the inverter via the rectifier circuit and the DC-DC circuit and outputs another path of a switch control signal to the three-phase switch control box; and the inverter returns a switch control signal to the rectifier circuit and the DC-DC circuit.

12. The electric vehicle of claim 11, wherein the external three-phase alternating current is first connected to the coil windings of the motor; the coil windings of the motor are further connected to the inverter and utilized as the charging inductors.

13. The electric vehicle of claim 11, wherein
  the input connector for inputting the external three-phase alternating current is further connected to a three-phase switch control box, and the motor is connected between the inverter and the three-phase switch control box;
  when the electric vehicle is in the driven state, one end of each of the coil windings of the motor is connected to the inverter, and the other ends of the coil windings are in short circuit connection by controlling the three-phase switch control box; and
  when the electric vehicle is in the charging state, one end of each of the coil windings of the motor is connected to the inverter, and the other end of each of the coil windings is connected to the input connector by controlling the three-phase switch control box; and the external three-phase alternating current passes through the coil windings of the motor and enters the inverter.

14. The electric vehicle of claim 11, wherein a phase number of the coil windings of the motor is 3N, and N represents an integer.

15. The electric vehicle of claim 14, wherein a number of the inverters is N, and each inverter is connected to every three-phase coil windings of the motor.

16. The electric vehicle of claim 11, wherein the inverter comprises a microprocessor unit, a driving circuit unit, an IGBT module, and a detection circuit; the detection circuit detects operation parameters of the motor and transmits the operation parameters of the motor to the microprocessor unit; the microprocessor unit outputs a control signal to the driving circuit unit; the driving circuit unit controls the IGBT module so as to control the 3N phases of the coil windings of the motor for normal commutation.

* * * * *